United States Patent [19]

Perez et al.

[11] Patent Number: 5,393,456
[45] Date of Patent: Feb. 28, 1995

[54] COMPOSITION FOR CONTROLLING SILICA AND WATER SOLUBLE SILICATE DEPOSITION

[75] Inventors: Libardo A. Perez, Morrisville, Pa.; J. Michael Brown, The Woodlands; Khac T. Nguyen, Houston, both of Tex.

[73] Assignee: Betz Laboratories, Inc., Trevose, Pa.

[21] Appl. No.: 80,900

[22] Filed: Jun. 22, 1993

Related U.S. Application Data

[62] Division of Ser. No. 884,668, May 18, 1992, Pat. No. 5,256,302.

[51] Int. Cl.$^6$ ................................................. C08F 5/10
[52] U.S. Cl. ................................ 252/180; 252/181; 252/180
[58] Field of Search .................... 252/180, 181, 80; 210/699, 700, 701

[56] References Cited

U.S. PATENT DOCUMENTS

| | | | |
|---|---|---|---|
| 2,957,931 | 10/1960 | Hamilton et al. | 260/403 |
| 4,046,707 | 9/1977 | Smith et al. | 252/180 |
| 4,127,483 | 11/1978 | Smith et al. | 210/58 |
| 4,159,946 | 7/1979 | Smith et al. | 210/58 |
| 4,239,648 | 12/1980 | Marshall et al. | 252/389 A |
| 4,452,703 | 6/1984 | Ralston et al. | 210/698 |
| 4,563,284 | 1/1986 | Amjad | 210/699 |
| 4,650,591 | 3/1987 | Boothe et al. | 210/700 |
| 4,693,829 | 9/1987 | Boffardi | 210/697 |
| 4,717,543 | 1/1988 | Sherwood et al. | 210/700 |
| 4,732,698 | 3/1988 | Chen | 252/181 |
| 4,774,303 | 9/1988 | Denzinger et al. | 526/212 |
| 4,828,713 | 5/1989 | McDonald et al. | 210/697 |
| 4,895,658 | 1/1990 | Amjad | 252/181 |
| 4,900,451 | 2/1990 | Brown et al. | 252/180 |
| 4,913,823 | 4/1990 | Lipinski et al. | 210/699 |
| 4,936,987 | 6/1990 | Persinski et al. | 210/699 |
| 5,023,000 | 6/1991 | Kneller et al. | 210/697 |
| 5,158,685 | 10/1992 | Freese | 210/699 |

*Primary Examiner*—Prince Willis, Jr.
*Assistant Examiner*—James M. Sibermann
*Attorney, Agent, or Firm*—Alexander D. Ricci; Richard A. Paikoff; Gregory M. Hill

[57] ABSTRACT

A method for the inhibition of silica and silicate deposits on the internal surfaces of a water system consisting of adding to the water system a composition comprised of a blend of two water soluble copolymers. The first copolymer contains repeat units of maleic or acrylic acids and a phosphinic acid, or salt forms thereof. The second copolymer contains repeat units of acrylic acid and allyl hydroxy propyl sulfonate ether, or salt forms thereof.

3 Claims, No Drawings

COMPOSITION FOR CONTROLLING SILICA AND WATER SOLUBLE SILICATE DEPOSITION

This is a divisional of application Ser. No. 07/884,668, filed May 18, 1992, now U.S. Pat. No. 5,256,302.

FIELD OF THE INVENTION

The present invention relates to aqueous systems in which problems develop related to the deposition of silica and/or silicates on the metallic surfaces containing the aqueous medium. Of special interest are those systems where efficient heat exchange dynamics are critical. Examples include condensate (e.g., boiler), cooling water systems, geothermal power generation and oil fields.

BACKGROUND OF THE INVENTION

The deposition of solids onto the structural surfaces in contact with water is a serious problem in numerous industrial operations. The buildup of solids is especially problematic and undesirable in systems where heat transfer is conducted across these surfaces. The heat exchange surfaces in cooling water systems and steam condensate systems are particularly adversely affected by the deposition of solids because the greater the amount of deposited solids, the lower the efficiency in conducting heat across those surfaces. A unique type of deposit is the scale caused by silica (based on silicon dioxide) and precipitated silicates (based on the salts of water soluble silica). Silica and silicate scale have exceedingly low thermal conductivity and, as a result, may reduce the heat transfer coefficient of a heat exchanger by as much as 90 percent.

Silica and silicate scale deposition is considered a unique problem because treatment programs effective against the deposition of more common scale forming species, such as calcium or magnesium containing carbonates, phosphonates and phosphates, are not effective in preventing silica and silicate scale deposition. This distinction may be based, in part, on the amorphous character of the silica and silicate species in contrast to the crystalline character of carbonates, phosphonates and phosphates.

Conventional treatment programs for dealing with the more common scale species involve maintaining the ions in solution. This technique cannot be applied to silica and silicate scale deposits since there are no known silica solubilizing chemicals. These deposits are generally prevented or minimized by keeping the concentration of silica and/or the silicates below their solubility limits. Such an approach requires the treatment of the feedwater prior to addition to the cooling or steam generating system. Such treatments include coagulation or filtration and are only marginally effective. Even with such precautions, frequent blowdown of the recirculating system may be required in order to maintain the lowest possible concentrations of these species.

It is an object of the present invention to provide a treatment composition that will be highly effective in reducing the deposition of silica and/or silicate precipitates on the internal structural surfaces of heat exchangers in various steam generating and cooling water systems.

RELATED ART

U.S. Pat. No. 2,957,931 discloses a method for the preparation of compounds with a direct carbon-phosphorous linkage by reacting a phosphorus compound with an olefin. Any compound of phosphorus having at least one phosphorus-hydrogen bond was described as a suitable reactant, especially hypophosphorous acid and its salts. Derivatives containing carboxyl groups (free or esterfied), including acrylic and maleic acids, can be utilized as the olefinic compound. It was specifically stated that use of an excess of the unsaturated compound can result in polymers, and that the amount of the phosphorus compound utilized governed the length of the polymer chain by "telomerization" or "chain transfer" reactions.

U.S. Pat. Nos. 4,046,707, 4,127,483 and 4,159,946 discloses a method of inhibiting the precipitation of scale forming salts of calcium magnesium, barium and strontium from aqueous systems with poly[prepared] in conjunction with hypophosphorous acid.

U.S. Pat. No. 4,239,648 discloses a synergistic combination for inhibiting the corrosion of ferrous metal in an aqueous system consisting of the telomeric compound resulting from polymerization of acrylic acid in the presence of hypophosphorous acid and a zinc salt, polyphosphate, silicate and/or molybdate. It was taught that the desired telomeric compounds could be prepared according to the teachings of Hamilton et al., '931. No claims for the use of the maleic acid analog were made.

U.S. Pat. No. 4,443,983 discloses a process for sealing an anodically produced oxide layer on aluminum or an aluminum alloy by treating the oxide layer with a phosphinocarboxylic acid compound. Acrylic and maleic acid polymers prepared in the presence of hypophosphorous acid are claimed.

U.S. Pat. No. 4,452,703 discloses a method for preventing scale in sugar evaporating equipment utilizing a mixture of a polycarboxylic acid and a copolymer of acrylic acid with a hydroxylated lower alkyl acrylate. The polycarboxylic acid species could be comprised of poly[maleic acid] or a phosphinocarboxylic acid. The phosphinocarboxylic acid taught was poly[acrylic acid] prepared in the presence of hypophosphorous acid.

U.S. Pat. No. 4,774,303 discloses a process for the preparation of acrylic polymers, in a solvent not containing less than 40% by weight of a C2-C6 alcohol, in the presence of an inorganic acid of phosphorus, including hypophosphorous acid. It was also taught that copolymers of acrylic acid with maleic acid could be prepared by this method. It was not indicated in this patent if the phosphorous acid species incorporated into the polymer matrix.

U.S. Pat. No. 4,563,284 discloses a synergistic mixture for inhibiting the precipitation of scale utilizing a phosphonocarboxylic acid and a polymeric phosphinocarboxylic acid. It was taught that the desirable polymeric phosphinocarboxylic acid could be prepared according to the teachings of Hamilton et al. '931. Of the scale that could be controlled, calcium silicate and magnesium silicate were specifically noted in the teachings.

U.S. Pat. No. 4,913,823 discloses a process for dissolving and removing silicate scale comprising magnesium silicate from aqueous systems utilizing phosphinocarboxylic acids. The teachings state that there is a difference between the removal and prevention of silicate scale, and that the amount of the phosphinocarboxylic acid added to the aqueous systems is comparatively larger than the amount used with methacrylic acid or EDTA in an aqueous system to prevent accumulation.

U.S. Pat. No. 4,936,987 discloses a method of inhibiting the precipitation of scale-forming salts of alkaline earth metal cations utilizing a synergistic mixture of a carboxylic/sulfonic acid copolymer with at least one compound selected from polycarboxylates or phosphinocarboxylic acids. The carboxylic/sulfonic acid copolymer example utilized was acrylic acid/2-acrylamido-2-methylpropylsulfonic acid (60/40 AA/AMPS$^R$). The phosphinocarboxylic acid utilized was Belclene 500, an acrylic acid polymer prepared in the presence of hypophosphorous acid. The teachings did not describe the use of allyloxyhydroxypropylsulfonate ether as a monomer in the preparation of the carboxylic/sulfonate acid copolymer.

SUMMARY OF THE INVENTION

The present invention is directed to a method for treating water systems, such as those found in cooling, steam generating (e.g., boiler), geothermal power generation, oil field and gas scrubbing, to inhibit the formation of silica and silicate scale on structural surfaces which contact the water system. The method requires adding to the water system a treatment consisting of a specific polymeric formulation. The polymers showing the desired efficacy are (1) a copolymer having repeat units of phosphinic acid ($PO_2H$) with either acrylic acid (AA) or maleic acid (MA) and (2) a copolymer having repeat units of acrylic acid (AA) with allyl hydroxypropyl sulfonate ether (AHPSE).

DETAILED DESCRIPTION OF THE INVENTION

In accordance with the invention, it has been discovered that certain water soluble copolymers, as shown in Formula I hereinafter, are effective in controlling the formation of silica and/or silicate deposits on the internal structural surfaces of various water systems. The water soluble polymers of the polymeric formulation of the invention have the structures:

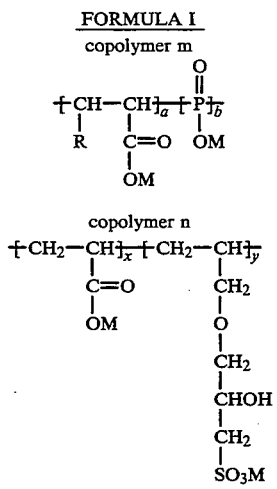

FORMULA I wherein R=H or COOM and M is H or a water soluble cation. The molar ratio of repeat units a:b is from about 30:1 to about 1:2 and should be from 10:1 to 2:1 with the a:b molar ratio of approximately 6:1 being preferred. The molar ratio of repeat units x:y is from about 30:1 to 1:20, with the x:y molar ratio of approximately 3:1 being preferred.

The number average molecular weights of each of the water soluble copolymers m and n of Formula I are in the range of 150 to 200,000. Preferably, the number average molecular weight will fall into the range of about 300 to 20,000 for each of polymers m and n. The method used to determine these values was chromatographic separation which was calibrated to polyacrylic acids.

The polymers m and n are blended together to form the formulation of the invention prior to addition to the water system to be treated. Each may also be added separately but essentially simultaneously, in predetermined amounts Whether preblended or added separately, the weight ratios of copolymers m:n should be within the range of about 25:1 to 1:50. Preferably, the weight ratio of m:n will be within the range of about 5:1 to about 1:10, with the range of about 1:1.5 to 1:4 being even more desirable.

With respect to the repeat units a, b, x and y of the polymers of the present invention, they may exist in acid or water soluble salt form when used in the target water system.

The separate polymers or the blended formulation of the invention should be added to the aqueous system, for which deposit control activity on structural surfaces in contact with an aqueous medium is desired, in an amount effective for the purpose. This amount will vary depending upon the particular system for which treatment is desired and will be influenced by factors such as, the area subject to deposition, pH, temperature, water quantity and the respective concentrations in the water of the potential scale and deposit forming species. For the most part, the treatment according to the invention will be effective when used at levels of about 0.1-500 parts per million parts of water, and preferably from about 1.0 to 100 parts per million of water contained in the aqueous system to be treated. The polymers may be added directly into the desired water system in a fixed quantity and in the state of an aqueous solution continuously or intermittently.

The polymers of the present invention are not limited to use in any specific category of water system. For instance, in addition to boiler and cooling water systems, the polymers may also be effectively utilized in gas scrubber, geothermal power generation and oil field systems and the like wherein the formation and deposition of silica or silicates is a problem.

EXAMPLES

The invention will now be further described with reference to a number of specific examples which are to be regarded solely as illustrative and not as restricting the scope of the invention.

The efficacy of the polymeric formulations of the invention was tested under dynamic conditions in nonevaporative laboratory Bench Top Recirculators (using makeup and 1 day blowdown). Treatment efficacy was determined from the appearance of the heat transfer surfaces at either 1, 2 or 4 days. One surface was heated to 150° F. (hot tube) and the other was cooled to 50° F. (cold tube). Results are shown in Table I.

Water matrix and test conditions are as follows:
pH=8.5
600 ppm $Ca^{2+}$ as $CaCO_3$
300 ppm $Mg^{2+}$ as $CaCO_3$
300 ppm $SiO_2$
100 ppm $NaHCO_3$
Flow rate:=6.0 gallons per minute for hot tube 1.0 gallon per minute for cold tube The formulations according to the invention as well as examples of comparative treatments were prepared as described below.

EXAMPLE 1

This consists of a blend of copolymer m, with repeat unit a consisting of acrylic acid (available from Ciba Geigy as Belclene 500) and copolymer n (available from Betz Laboratories as HPS II). The concentrations of m and n added for each specific test conducted is shown in Table I.

EXAMPLE 2

This formulation is similar to Example 1 with the exception being that the acrylic acid moiety in copolymer m is replaced with maleic acid.

Comparative Example A

This example consists of 15 ppm of copolymer m with the repeat unit a being acrylic acid. The product used was the commercially available Belclene 500.

Comparative Example B

This example consists of 7.5 ppm of a conventional chelant, 1-hydroxyethylidene diphosphonic acid (HEDP) and 40 ppm of copolymer n.

Comparative Example C

This example consists of 15 ppm of copolymer m as described above in comparative Example A and 35 ppm of an acrylic acid/acrylamidosulfonic acid copolymer (available from Ciba Geigy as Belclene 400).

Comparative Example D

Again, 15 ppm of copolymer m as described in comparative Example A is blended with 35 ppm of an acrylic acid/2-acrylamido-2-methylpropane sulfonic acid copolymer (available from Calgon as TRC-233).

TABLE I

| | | | Silica/Silicate Deposition | |
|---|---|---|---|---|
| Test | Treatment | Copolymer conc. (ppm) | Hot Tube | Cold Tube |
| A | Example 1 | 15 (m) 35 (n) | SS: mod. dep. (2d) | SS: clean (2d) |
| B | Example 1 | 15 (m) 35 (n) | SS: clean (2d) LCS: clean (4d) | SS: lt. dep. (2d) |
| C | Example 1 | 15 (m) 40 (n) | SS: lt. dep. (2d) | SS: clean (2d) |
| D | Example 1 | 15 (m) 40 (n) | SS: clean (1d) LCS: clean LCS coupons: cl. (4d) | SS: clean (1d) LCS: clean |
| E | Example 1 | 18 (m) 35 (n) | SS: lt. dep. (2d) LCS: lt. dep. (2d) | SS: lt. dep. (2d) LCS: lt. dep. (2d) |
| F | Example 2 | 15 (m) 40 (n) | SS: lt. dep. (2d) | SS: lt. dep. (2d) |
| G | Example 2 | 15 (m) 40 (n) | SS: mod. dep. (2d) | SS: mod. dep. (2d) |
| H | Example 2 | 18 (m) 35 (n) | SS: clean (2d) LCS: clean LCS coupons: cl. (4d) | SS: clean (2d) LCS: clean LCS coupons: cl. (4d) |
| I | Example 2 | 18 (m) 35 (n) | SS: lt. dep. (1d) LCS: lt. dep. (3d) | SS: lt. dep. (1d) LCS: lt. dep. (3d) |
| J | Example 2 | 18 (m) 35 (n) | SS: clean (1d) LCS: clean (3d) | SS: clean (1d) LES: clean (3d) |
| K | Comparative Example A | | SS: hvy. dep. (2d) | SS: hvy. dep. (2d) |
| L | Comparative Example B | | SS: hvy. dep. (2d) LCS: hvy. dep. (2d) | SS: hvy. dep. (2d) LCS: hvy. dep. (2d) |
| M | Comparative Example C | | SS: hvy. dep. (2d) LCS: hvy. dep. (2d) | SS: hvy. dep. (2d) LCS: hvy. dep. (2d) |
| N | Comparative Example D | | SS: hvy. dep. (2d) LCS: hvy. dep. (2d) | SS: hvy. dep. (2d) LCS: hvy. dep. (2d) |

Legend:
lt. dep: light deposit
mod. dep: moderate deposit
hvy. dep: heavy deposit
SS: stainless steel
LCS: low carbon steel
d: number of days
cl. clean While this invention has been described with respect to particular embodiments thereof, it is apparent that numerous other forms and modifications of the invention will be obvious to those, skilled in the art. The appended claims and this invention generally should be construed to cover all such obvious forms and modifications which are within the true spirit and scope of the present invention.

What we claim is:

1. A composition for the control of silica or silicate deposits on the internal structural surfaces of a water system comprising I) a first copolymer, m, having the structure:

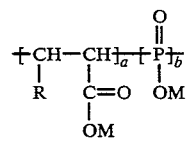

wherein R=H or COOM, M is H or a water soluble cation, the molar ratio of repeat units a:b is from about 30:1 to 1:2 and the number average molecular weight is from about 150 to about 200,000 and II) a second copolymer, n, having the structure:

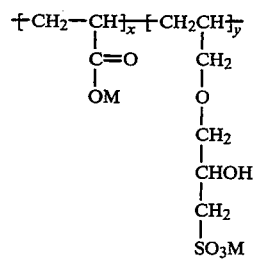
wherein M is H or a water soluble cation, the molar ratio of repeat units x:y is about 3:1 and the number average molecular weight is from about 300 to about 20,000, wherein the ratio of m:n is from about 1:1.5 to 1:4, by weight.
2. The composition of claim 1 wherein the molar ratio of a:b is approximately 10:1 to 2:1.
3. The composition of claim 1 further comprising water.
* * * * *